United States Patent
Rodgers

[11] Patent Number: 5,925,155
[45] Date of Patent: Jul. 20, 1999

[54] ROTARY DRUM AIR FILTER

[76] Inventor: Donald H. Rodgers, 5934 South & Westcreek Ct., Ft. Worth, Tex. 76133

[21] Appl. No.: 08/958,166

[22] Filed: Oct. 27, 1997

Related U.S. Application Data

[60] Provisional application No. 60/029,765, Oct. 30, 1996.

[51] Int. Cl.$^6$ .................................................. B01D 46/04
[52] U.S. Cl. .............................. 55/282; 55/285; 55/290; 55/294; 55/302; 210/402
[58] Field of Search .............................. 55/290, 294, 302, 55/282, 285; 210/402

[56] References Cited

U.S. PATENT DOCUMENTS

| | | | |
|---|---|---|---|
| 4,222,754 | 9/1980 | Horvat | 55/290 |
| 4,298,361 | 11/1981 | Hocutt et al. | 55/290 |
| 4,377,401 | 3/1983 | Laughlin | 55/290 |
| 4,481,021 | 11/1984 | Kinney, Jr. et al. | 55/290 |
| 4,654,059 | 3/1987 | Matyas | 55/290 |
| 4,662,800 | 5/1987 | Anderson et al. | 55/290 |
| 4,689,143 | 8/1987 | Miers | 55/290 |
| 4,725,292 | 2/1988 | Williams | 55/290 |
| 5,006,136 | 4/1991 | Wetter | 55/290 |
| 5,181,945 | 1/1993 | Bodovsky | 55/290 |
| 5,183,487 | 2/1993 | Lodico et al. | 55/290 |

*Primary Examiner*—Jay H. Woo
*Assistant Examiner*—Minh-Chau T. Pham
*Attorney, Agent, or Firm*—Wendell Coffee; Mark E. Scott

[57] ABSTRACT

A rotary drum air filter has a drive tire where a rubber tire runs against a drive rim attached to the drum co-axial therewith. A seal on the forward part of the drum rides upon a conic section on the scroll. Differential air pressure across the drum holds the seal against the conic section on the scroll. A unitary rigid manifold with a plurality of pipes is mounted for rotation about its longitudinal axis. Therefore, by rotation of the manifold, nozzles in the pipes can be exposed for adjustment and inspection. Nozzle tips in each the pipes extending from the manifold are adjustable so as to regulate the distance from the lip of the nozzle tip to the surface of the drum. For use with an atmosphere heavily laden with lint, a two-part nozzle is used so that the leading edge of the nozzle can be spaced away from the filter medium on the drum surface to accommodate a thick layer of lint which accumulated on the drum surface. The drum wheels or supports for the perimeter of the drum are made by cutting half of each wheel from sheetmetal with a guided cutter. The two halves(semidiscs) are welded together and a strap or band is welded to the perimeter to form a rigid cylindrical rim thereon.

6 Claims, 4 Drawing Sheets

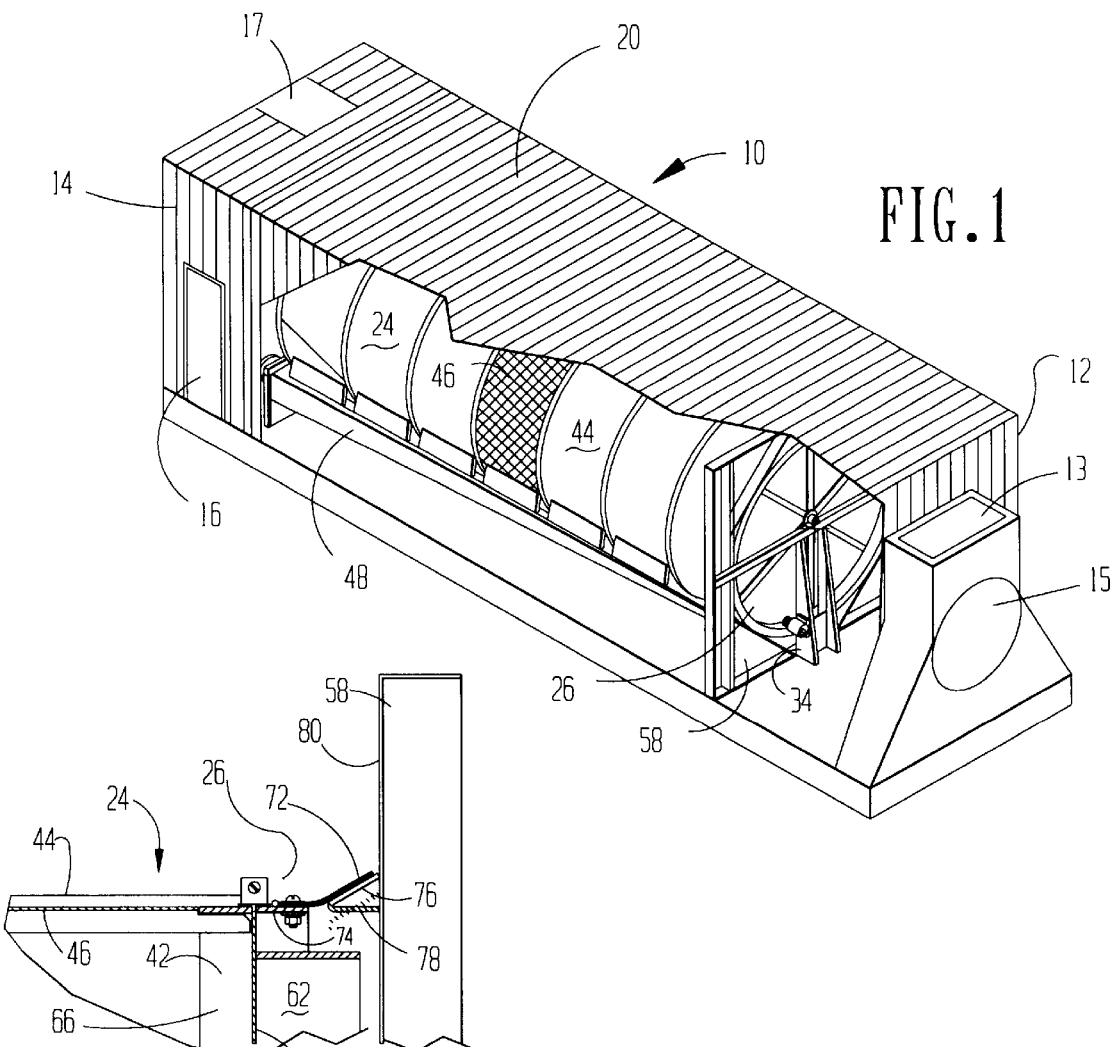
FIG.1
FIG.3
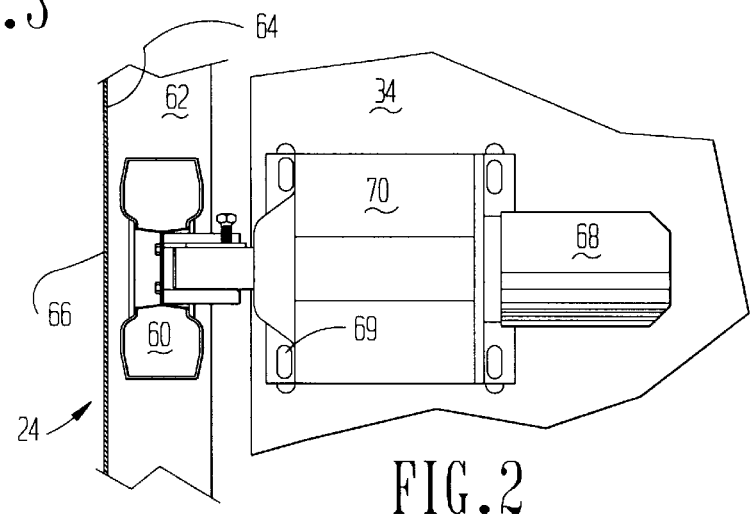
FIG.2

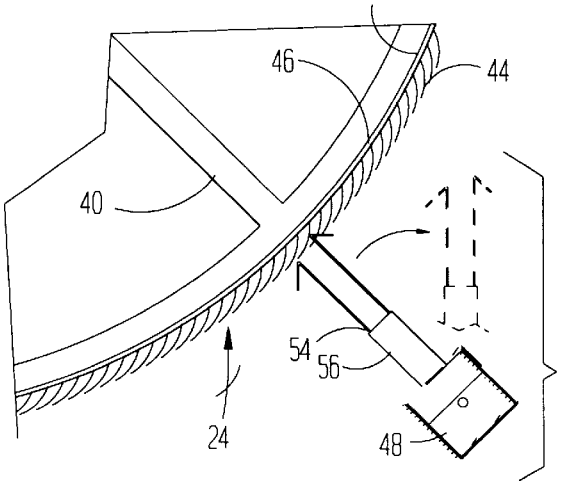
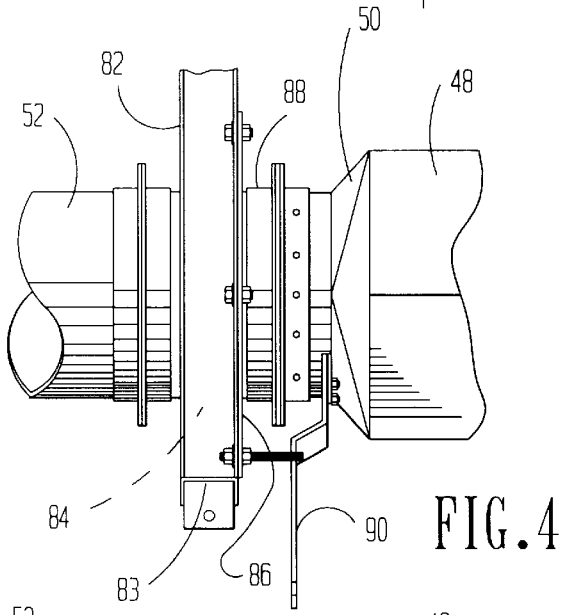
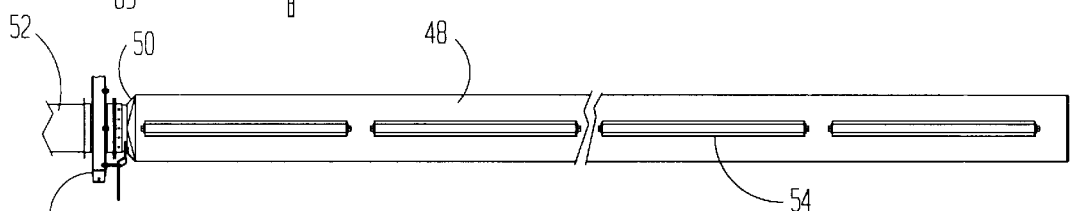
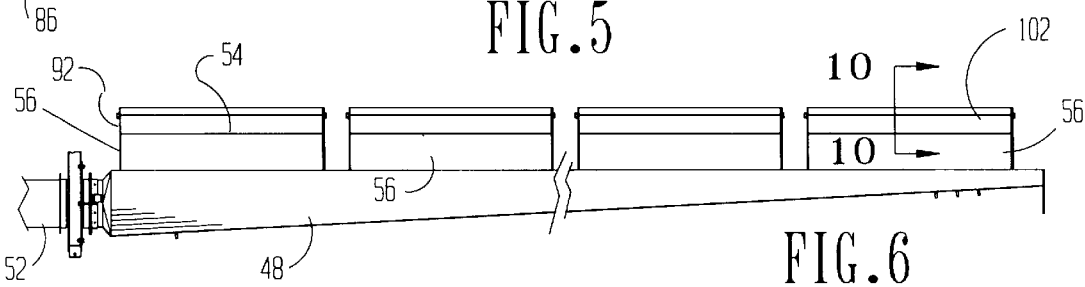

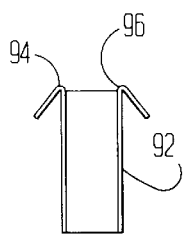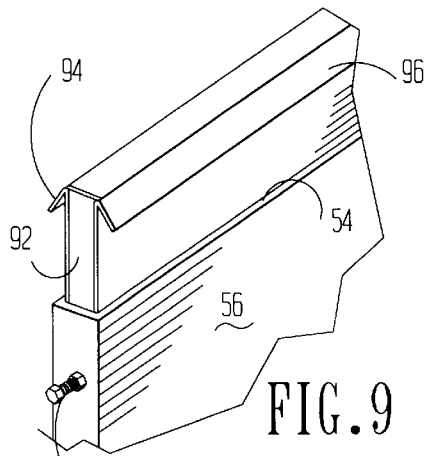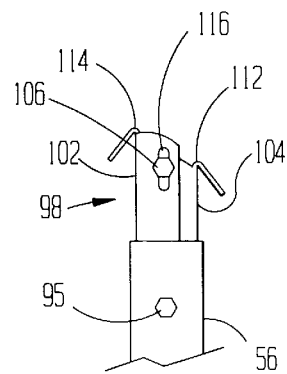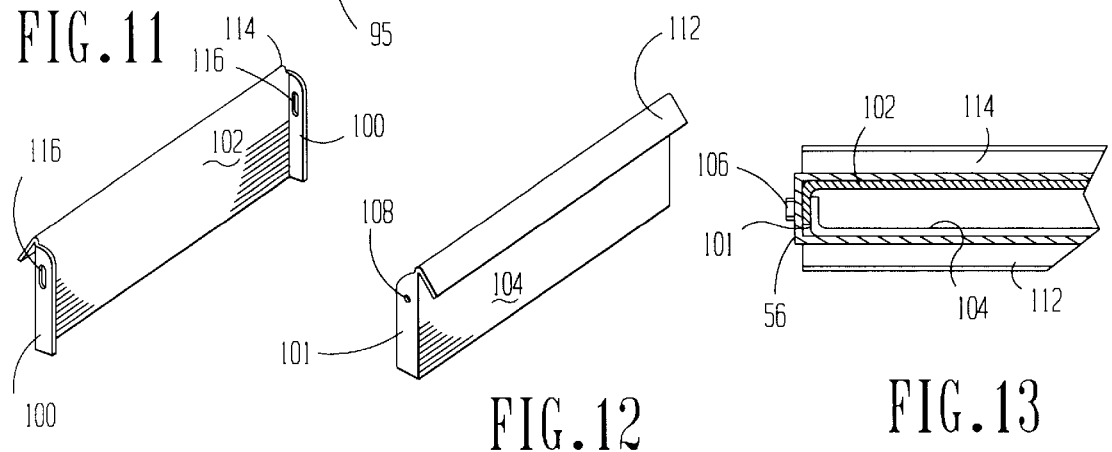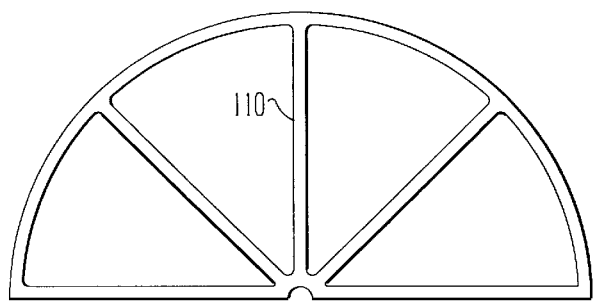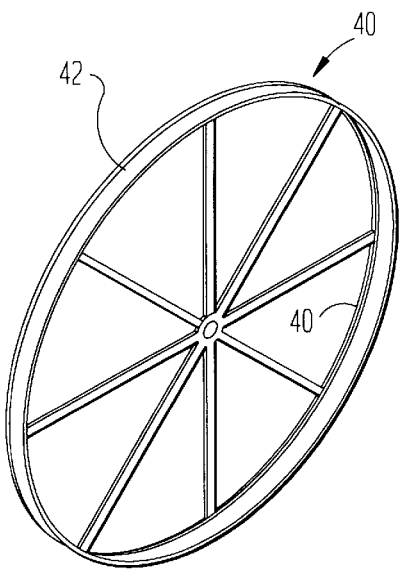

ROTARY DRUM AIR FILTER

CROSS REFERENCE TO RELATED APPLICATION

PROVISIONAL PATENT APPLICATION

Applicant filed a Provisional Application, Ser. No. 60/029,765 on Oct. 30, 1996. Specific reference is made to that document.

BACKGROUND OF THE INVENTION (1) Field of the Invention

This invention relates to rotary drum industrial air filters. Managers of industrial plants have ordinary skill in this art.

(2) Description of the Related Art

Rotary drum air filters are made to filter large amounts of air and are used often in extremely dusty air filled with many different particles. For example, rotary drum filters are used in the cotton industry, particularly in spinning mills.

Typically a rotary drum includes a drum about nine feet in diameter and twelve feet in length covered with about three hundred and fifty square feet of filtering medium. The drum has a closed back end and a fan or front end. The entire drum is sealed within an enclosure which is typically about twenty feet in length, that is having about five feet forward of the drum and about two feet behind the back. Also it is about fifteen feet wide which therefore has a clearance of about two and one-quarter feet on the manifold side from the edge of the drum and about three inches on the other side of the drum. The fan end of the drum is sealed to a front scroll. The front scroll extends and seals against the sides of the enclosure. The enclosure has an air inlet conveniently arranged. A fan in front of the enclosure draws air into the enclosure, through the filter media, where dust and other foreign particles would be caught on the filter media, and the filtered air expelled through the fan end of the drum. The drum is cleaned by suction nozzles against the outside surface of the filter media. Air suction upon the nozzles "vacuums off" the dust accumulated on the outside of the filter.

SUMMARY OF THE INVENTION

Progressive Contribution to the art.

This application discloses improved:

1. Drum drive.
2. Drum seal at the fan end.
3. Manifold; a) single piece manifold which is mounted for rotation, b)nozzle tips and c)two part tips.
4. Drum wheels supporting the filter fabric.

1. Drum drive: The drum is driven by a rubber pneumatic tire which is mounted to rotate on the inner surface of a band attached to the fan end of the drum.

2. Drum end seal: An improved seal having a flexible portion of the seal mounted upon the drum riding against a rigid portion mounted on front end of the scroll. The flexible portion is a flap which is held by the differential air pressure against the rigid portion is a short conic section on the scroll. The conic section being a conic frustum.

3. Manifold: The manifold has rectangular pipes from the manifold. Each pipe is fluidly attached to the manifold. The nozzles are made of sheet metal and are telescoped in the pipes. The nozzles can either be a single construction for the leading and trailing nozzle edges, or can be separate so they may be adjusted separately. The entire manifold discussed above is mounted to rotate about its longitudinal axis so that the nozzles can be rotated away from the filter media covering of the drum for adjustment, cleaning, or maintenance purposes.

4. Wheels: The circular drum members or "wheels" are cut from sheet metal by programmed cutters into semi-discs with excess metal cut away to form spokes. Two semi-discs are welded together in a jig and bands are placed along the edges thereof.

OBJECTS OF THIS INVENTION

An object of this invention is to filter impurities from large volumes of air in industrial plants.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is a perspective view with parts broken away of a drum filter according to this invention.

FIG. 2 is a sectional view showing the drum drive.

FIG. 3 is a sectional view showing the drum-seal to the scroll.

FIG. 4 is a top plan view of the manifold connected to the suction pipe through the support.

FIG. 5 is a top view of the manifold which has been foreshortened for purposes of illustration.

FIG. 6 is side elevational view of the manifold which has been foreshortened for purposes of illustration.

FIG. 7 is a sectional view through the manifold showing the relationship of the manifold to the filter drum in two positions.

FIG. 8 is an end elevational view of a nozzle box tip.

FIG. 9 is perspective view of a box nozzle tip in position in position in a nozzle box.

FIG. 10 is a sectional view of a two-part nozzle tip taken substantially along line 10—10 of FIG. 6.

FIG. 11 is a perspective view of a back portion of a nozzle tip.

FIG. 12 is a perspective view of the front portion of a nozzle tip.

FIG. 13 is a sectional view taken substantially along line 13—13 of FIG. 10.

FIG. 14 is a view of a semidisc of a wheel which is a plan view during manufacture but a elevational view when completed and in service.

FIG. 15 is a perspective view of a completed wheel with rim.

CATALOGUE OF ELEMENTS

Figure 16:
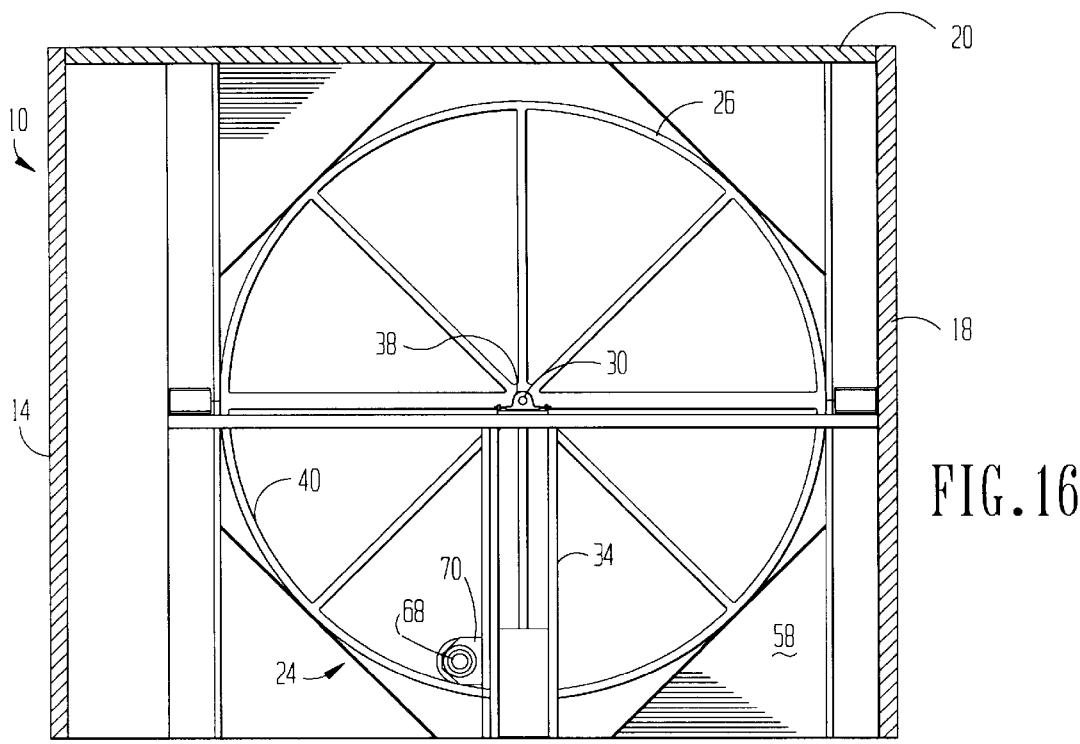
FIG. 16 is an elevational view of the front of the drum and scroll.
Figure 17:
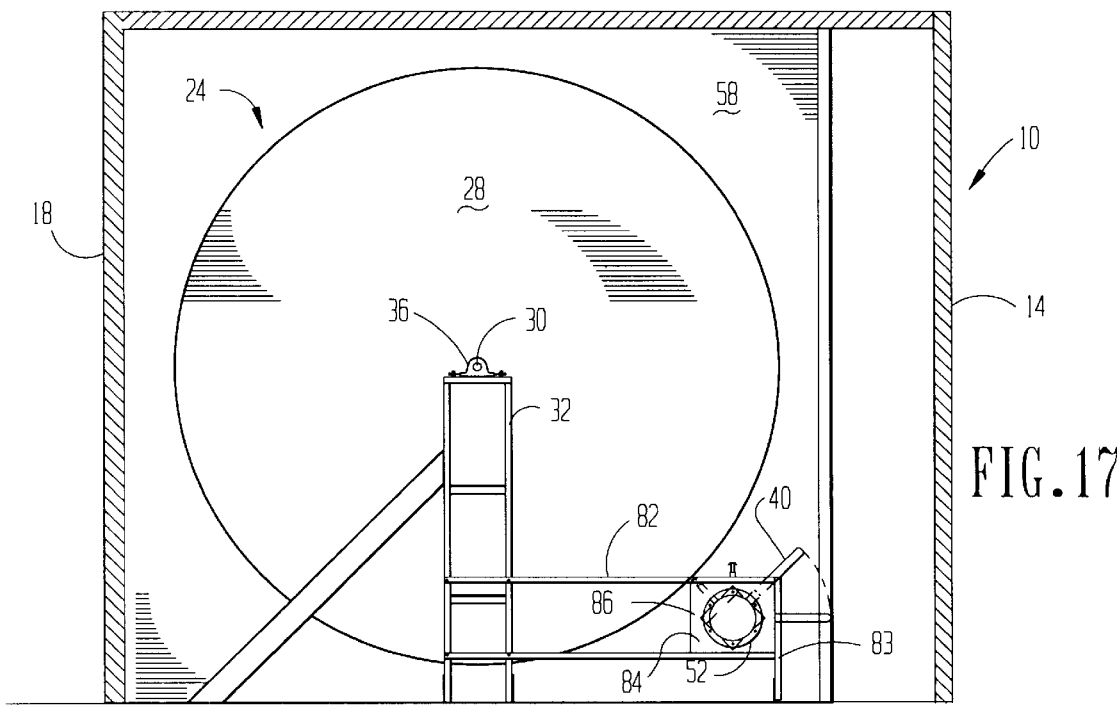
FIG. 17 is an elevational view of the back of the drum and manifold frame.

As an aid to correlating the terms to the exemplary wing(s), the following catalog of elements is provided:

| | |
|---|---|
| 10 | enclosure |
| 12 | fan or front end |
| 13 | front end opening |
| 14 | manifold side |
| 15 | fan |
| 16 | access door |
| 17 | inlet opening |
| 18 | other side |
| 20 | top |
| 24 | drum |
| 26 | fan end |
| 28 | back end |
| 30 | shaft |
| 32 | back pedestal |
| 34 | front pedestal |
| 36 | back bearing |
| 38 | front bearing |
| 40 | wheels |
| 42 | flanges |
| 44 | filter media |
| 46 | lathe |
| 48 | manifold |
| 50 | back end |
| 52 | suction pipe |
| 54 | nozzles |
| 56 | nozzle pipes |
| 58 | scroll or baffle |
| 60 | rubber pneumatic tire |
| 62 | drive rim |
| 64 | radial face |
| 66 | front wheel |
| 68 | motor |
| 69 | slots |
| 70 | motor frame |
| 72 | flexible flap/seal |
| 74 | front flange |
| 76 | conic surface |
| 78 | stationary member |
| 80 | inside surface |
| 82 | frame |
| 83 | support |
| 84 | circular opening |
| 86 | plate |
| 88 | nipple |
| 90 | handle |
| 92 | nozzle tip |
| 94 | after lip |
| 95 | set screw |
| 96 | foreword lip |
| 98 | adjustable tip box |
| 100 | wings, back |
| 101 | wings, front |
| 102 | back portion |
| 104 | forward portion |
| 106 | bolt |
| 108 | tapped hole |
| 110 | semidisc |
| 112 | forward lip |
| 114 | rear lip |
| 116 | slot |

DESCRIPTION OF THE PREFERRED EMBODIMENT

Referring to the drawing there may be seen enclosure 10. The enclosure includes front or fan end 12 and a manifold side 14. The manifold side has an access door 16. The enclosure also has other side 18, top 20, and back.

The drum 24 is mounted inside of the enclosure 10. The drum also has fan end 26. The fan end is open. Back end 28 of the drum is closed as by sheet metal. Shaft 30 runs along the axis of the drum and is supported by back pedestal 32. The shaft extends through the back of the drum. Front pedestal 34 supports the shaft at the front of the drum. Back bearing 36 upon the back pedestal 32 supports the shaft at the back end 28 while front bearing 38 mounted upon the front pedestal supports the shaft at the fan end 26. A series of wheels 40 are spaced at approximately twenty-seven inch intervals along the length of the drum. Each wheel is attached to the shaft 30 and has flange 42 along its periphery. Filter media 44 is attached over expanded metal lathe 46 which covers the cylindrical covering of the outer portion of the drum.

Manifold 48 is mounted adjacent to the drum and extends the length of the drum along the manifold side 14 of the enclosure. The back end 50 of the manifold is attached to a suction pipe 52. Nozzles 54 on the boxes or pipes 56 along the manifold are adjacent to the filter media. As the drum is rotated, foreign matter (lint, dust, dirt) is pulled from the filter media and carried away through the nozzles 54, pipes 56, manifold 48, and suction pipe 52.

The enclosure 10 is closed at the fan end 12. An opening has fan 15 attached thereto to draw air into the enclosure from the space in front of the drum.

The fan end 26 of the drum is surrounded by a sheet metal scroll or baffle 58. The fan end 26 of the drum is sealed to the scroll 58 to prevent loss of air. In operation, air enters the enclosure 10 through inlet opening 17 located in the enclosure 10 at a convenient location behind the scroll 58. The dirty air entering from the back will be pulled through the filter media and will be expelled as clean air through the front opening 13.

Those having ordinary skill in the art will understand that a filter according to the description to this point of elements 10–54 and 58 are old and well-known in the art and commercially available on the market.

Drum Drive(FIG. 2)

According to this invention the drum is driven by rubber pneumatic tire 60 bearing against the inner surface of rim 62 which is attached to the fan end 26 of the drum. The drive rim 62 is attached to the radial face 64 of the front wheel 66. The diameter of the drive rim 62 will be less, for example six inches less, than the diameter of the wheel at the flange 42. The tire is mounted upon the shaft of a suitable motor 68 which is attached to the front pedestal 34. By suitable slots 69 within motor frame 70 and front pedestal 34, the pressure by which the rubber pneumatic tire 60 bears against the inside of the rim 62 may be adjusted.

Drum Seal(FIG. 3)

A flexible, fabric-reinforced elastometric flap or seal 72 is attached to front flange 74 mounted upon the front wheel 66 at the periphery thereof. The seal 72 rides against conic surface 76 of stationary member 78 which is attached to inside surface 80 of the scroll 58. The surface 80 is referred to as the inside surface meaning the surface facing and adjacent to drum 24. It will be understood that there will be a slight differential pressure across the seal 72 with greater pressure on the outside of the drum than on the inside of the drum because of the fan 15 pulling the air from the inside of the drum. This differential pressure will hold the flap 72 in good sealing relationship to the conic surface 76.

Manifold(FIGS. 4–7)

Frame 82 extends from the back pedestal 32 to support 83 away from the perimeter of the drum. Manifold 48 is mounted for rotation to a circular opening 84 through plate 86 mounted upon the support 83. The rear side of the plate 86 has a flange whereby the suction pipe 52 may be attached. The manifold is rotatable attached within nipple 88 extending from the inside side of the support 83. Handle 90 is attached to the manifold 48 near frame 82. The handle is held in position by a suitable mechanism attached to the frame 82. One of these positions holds the nozzles 54 on the pipes 58 on a diametrical line from the shaft 30. (FIG. 7) Another position, with the handle 90 down, swings the nozzles away from the filter surface so they are available for maintenance (FIG. 7 broken line). It will be understood that the maintenance persons may enter the enclosure by the access door 16 in the manifold side 14 of the enclosure.

Nozzle Tips (FIG. 8–13)

Each of the manifold pipes 56 will have the open nozzle 54 adjacent to the drum surface. Each nozzle is about 24" long and about 1" wide. The nozzles would extend to within about 3" of the face of the drum. Within the nozzle pipes 56, one of two type nozzle tips may be inserted.

For filters which will operate in an environment which have primarily dust and low quantities of lint to be filtered use a box-shaped nozzle box tip 92. The box-shaped nozzle tip will be approximately 24" long and 1" wide and made of sheet metal. The box tip 92 will have after lip 94 and forward lip 96. With normal rotation of the drum, the forward lip 96 is spaced about ½" from the drum with the dust in the filter media and the after tip 94 is also spaced about ½" from the drum. Each of the lips consist of a bend in the sheet metal which forms about a 30° angle to the portion of the sheet metal which is telescoped within the nozzle pipe 56. The nozzle tip 92 will be securely but adjustably fixed within the pipe by a set screw 95 on each end. For normal service, the nozzle tip 92 will be adjusted so that each of the lips are about ½" from the filter surface.

However, when the filter is to be used in an environment having a large amount of lint to be filtered from the air, it is desirable that forward lip 112 be away from the filter media more than rear lip 114.. This is because the lint will form a cushion, or pad, or mat extending from the surface filter media up to ¾" or more. Therefore if a normal spacing were used, a certain amount of the lint is scraped from the surface of the filter before passing by the forward lip 112 and therefore it accumulates on the floor of the enclosure 10. It is therefore desirable that the forward lip 112 be spaced away from the filter media 44.

This lip adjustment is accomplished by forming a two part nozzle tip .98. After-half tip or back portion 102 will be of sheetmetal with the back lip 114 and two wings 100, one attached to either end. The forward portion 104 will be of sheetmetal with the lip 112 two wings 101. Both back lip 114 and forward lip 112 are bent about a 30° angle as described for the lips 94 and 96. The back portion has a slot 116 in each of the wings 100. The forward portion has a tapped hole 108 which is threaded in each wing 101. The two portions 102 and 104 are assembled with the wings 100 on the outside and the wings 101 on the inside. Bolt 106 extends through the slot and into the threaded hole 108. With the bolt 106 tightened it may be seen there is formed a box quite similar to the box 92 with the additional advantage of being able to adjust the lips 112 and 114 one relative to the other. With such a box it is possible to telescope one box into each manifold pipe 56 and adjust the height of the box with the set screw 95 as before.

If desired a box similar to box 92 may be built which has a non-adjustable difference in height between the front lip and the back lip.

The distance from the filter media to the lips may be adjusted separately and fixed in place by tightening set screw 95. Normally the after lip 114 on portion 102 will always be adjusted to be about ½" from filter media while forward lip 112 on portion 104 might be as much as 1 ¼" or even 1½" away from the filter media. It is desired that there be sufficient distance away from the filter media to accommodate lint which may be caught on it but not far enough away as to leave a gap that air could be drawn in between the filter media and the forward lip. Such bypassing would not remove the accumulated debris upon the filter media which is the purpose of the nozzles.

It will be understood that to service the nozzle tips and to adjust the distance of the lips upon the nozzle tips a correct distance and to clean them is an easy matter. During the time of maintenance the manifold is rotated by manipulation of handle 90 so that the tips are accessible for maintenance or replacement.

Wheels (FIG. 14–15)

According to this invention, on large diameter drums, the wheels 40 are manufactured in semi-circles or semi-discs. One half of each wheel (semidisc) is cut from sheetmetal. This is done by laser guided flame cutters so that the spokes and perimeter as well as a notch for the shaft is formed from sheet metal. Then two sheetmetal half wheels or semidisc 110 are placed in a jig and welded together with precision. A strap of sheetmetal is shaped as the rim. The flange or strap or rim 42 is welded into place. Additionally, channel iron pieces are attached along the spokes resulting in the necessary rigidity of the flat cylindrical surface for the attachment of the expanded metal lathe 46 to which the filter media 44 is attached.

Where the drum diameter is small, the entire disc portion may be of a single piece construction, i.e. the entire center disc is cut from a single piece of sheetmetal.

Extending between two adjacent formed wheels, there may be cross-bracing. This cross-bracing extends from the center of an outermost wheel to the circumference of an inner wheel; thereby, the cross-bracing keeps the drum a right circular cylinder. It will be understood that any or all of the wheels may have this bracing between them, but only one such set of bracing is required to keep the drum a right circular cylinder.

In all other regards the filter drum is constructed and operated similar to the drum filters which are known to the art and commercially on the market before this invention.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. The improved structure of a rotary drum air filter comprising:
   a) a rotary cylindrical drum mounted for rotation about a drum axis, said drum having filter media covering the drum's circumferential surface,
   b) a manifold having an axis lying along the exterior of the drum, said manifold axis parallel to the drum axis,
   c) said manifold mounted for rotation about said manifold axis,
   d) nozzles rigidly attached to said manifold,
   e) said nozzles in contact with the filter media on said drum when said manifold is rotated to an operation position, and
   f) said nozzles away from said filter media when said manifold is rotated to a maintenance position.

2. The structure as defined in claim 1 further comprising:

g) pipes attached to said manifold, h) each of said pipes having one of said nozzles adjustably telescoped therein.

3. The structure as defined in claim 2 further comprising:

i) said nozzles comprising a front portion and a back portion;

j) said front portion attached in adjustable relation to said back portion.

4. The improved structure of a seal for a rotary drum air filter comprising:

a) a filter having
  i) a cylindrical drum having a horizontal axis with a drum open end, and a drum closed end,
  ii) a baffle adjacent to the drum with a hole at the drum open end, b) a conic circular surface on the baffle, and c) a flexible flap on the drum encircling the open end, and d) a portion of said flexible flap overlaid on said conic circular surface forming e) a seal between said drum and said baffle.

5. In a drum for a rotary drum air filter having:

a) a plurality of wheels mounted along a shaft, b) a lathe placed over the wheels, c) a filter media over said lathe, the-improved wheel structure comprising:

d) two semi-discs attached along their straight surfaces to form a circular disc, e) said circular disc having
  i) a hub and
  ii) a rim, f) excess material removed from between the hub and rim resulting in g) spokes extending from the hub to the rim, and h) strap material attached to the circumference of said disc, forming j) a flange.

6. The invention as defined in claim 5 further comprising:

m) said rotary drum being cylindrical, n) a manifold with an axis lying along the drum, o) said manifold mounted for rotation about said axis, p) nozzles rigidly attached to said manifold, q) said nozzles in contact with the filter media on said drum when said manifold is rotated to an operation position, r) said nozzles away from said filter media when said manifold is rotated to a maintenance position, s) said filter having two elements:
  i) one element being said rotary cylindrical drum with an open end, and
  ii) another element being a baffle with a hole at the open end of the drum, t) a circular conic surface on one of the baffle, and u) a flexible flap on said drum, v) a portion of said flexible flap overlaid on said circular conic surface forming w) a seal between said drum and said baffle, x) said drum having a cylindrical surface and end thereof, y) a rubber tire, and z) a motor, aa) said tire attached to a rotor of said motor, bb) said tire in contact with said cylindrical surface, forming cc) a drive unit for said drum.

* * * * *